U S 0 0 8 1 6 4 3 1 9 B 2

US008164319B2

(12) United States Patent
Bodano et al.

(10) Patent No.: US 8,164,319 B2
(45) Date of Patent: Apr. 24, 2012

(54) SYSTEM AND METHOD FOR ADAPTING CLOCKING PULSE WIDTHS FOR DC-TO-DC CONVERTERS

(75) Inventors: Emanuele Bodano, Padua (IT); Andrea Morra, Salzano (IT); Andrea Vecchiato, Mirano (IT); Marco Piselli, Padua (IT)

(73) Assignee: Infineon Technologies AG, Neubiberg (DE)

( * ) Notice: Subject to any disclaimer, the term of this patent is extended or adjusted under 35 U.S.C. 154(b) by 691 days.

(21) Appl. No.: 12/242,304

(22) Filed: Sep. 30, 2008

(65) Prior Publication Data

US 2010/0079122 A1    Apr. 1, 2010

(51) Int. Cl.
*G05F 1/575*     (2006.01)
*G05F 1/56*      (2006.01)

(52) U.S. Cl. ........................................ 323/284; 323/285

(58) Field of Classification Search .................. 323/282, 323/283, 284, 285
See application file for complete search history.

(56) References Cited

U.S. PATENT DOCUMENTS 7,675,279 B2 *  3/2010  Okamoto et al. ............. 323/283
7,679,346 B2 *  3/2010  Lin et al. ...................... 323/282

* cited by examiner

*Primary Examiner* — Gary L Laxton
(74) *Attorney, Agent, or Firm* — Slater & Matsil, L.L.P.

(57) ABSTRACT

A system and method for adapting a width of a clocking pulse for clocking a DC-DC converter, wherein the width of the clocking pulse is selected based upon the duty cycle of the DC-DC converter. When the DC-DC converter operates below a predefined threshold duty cycle, a clocking pulse of a first width is selected to allow operation of the converter at a minimum predefined duty cycle with a clocking frequency that minimizes output voltage ripple. The first width corresponds to an on-time of a switching transistor of the DC-DC converter when the converter is operated at the minimum duty cycle. When the DC-DC converter operates above the predefined threshold duty cycle, a clocking pulse of a second width is selected to allow operation of the converter at high duty cycles while simultaneously avoiding missed inductor current pulses and generation of sub-harmonic voltage oscillations.

21 Claims, 11 Drawing Sheets

SYSTEM AND METHOD FOR ADAPTING CLOCKING PULSE WIDTHS FOR DC-TO-DC CONVERTERS

TECHNICAL FIELD

Certain embodiments of the invention relate to modifying on-times of DC-DC converters for avoiding sub-harmonic oscillations based upon the duty cycle of the DC-DC converters. More specifically, certain embodiments of the invention relate to adapting clocking pulse widths for clocking DC-DC converters based upon the duty cycle of the DC-DC converters.

BACKGROUND

A simple way to transform a DC voltage is to use a voltage divider circuit. However, voltage dividers are inefficient since a portion of the input voltage is discharged as heat. The excess heat can affect the operating characteristics of other circuit components, even causing other components to default. In addition, there is no method of regulating the output voltage of the voltage divider circuit, since the output voltage varies with the input voltage.

A Buck converter, on the other hand, can be remarkably efficient and self-regulating, making it useful for tasks such as converting a typical 12-24V battery voltage in a laptop down to a few volts required to power a processor, for example. A Buck converter operates as a switched-mode power supply that uses two switches (typically a transistor and a diode), an inductor and a load capacitor to step-down a DC source voltage according to a specified duty cycle.

In operation, the switches control the connection of the inductor to a source voltage. The switches electrically couple the inductor to the source voltage during a charging portion of a clocking period, thereby storing energy in the inductor. The switches electrically decouple the inductor from the source voltage during a discharging portion of the clocking period, enabling the inductor to discharge stored electromagnetic energy into a load. The duty cycle is the ratio of the charging time period to the discharging time period, which for an ideal converter, is equivalent to the ratio of the output voltage measured across the load to the source voltage.

Some Buck converters utilize feedback control loops to control operation of the switches and stabilize the output voltage, and hence, stabilize the duty cycle. These feedback control loops typically use clocking pulses of fixed width to control the switches. However, using fixed width clocking pulses places operational constraints on converter clocking frequencies and may cause voltage output instabilities in the form of sub-harmonic circuit oscillations.

SUMMARY OF THE INVENTION

In an embodiment of the invention, an adaptive pulse width modulation DC-DC converter includes an LC circuit, a switching circuit coupled to the LC circuit, and a current control loop coupled to the LC circuit and the switching circuit. In one embodiment, the current control loop selects a clocking pulse from a plurality of clocking pulses for clocking the switching circuit at a clocking frequency $f_{CK1}$ based upon a duty cycle of the DC-DC converter, where the plurality of clocking pulses have a plurality of pulse widths.

In an embodiment of the invention, the current control loop selects a clocking pulse of a first width when the duty cycle is less than a threshold duty cycle. The first width is equal to a predefined minimum duty cycle divided by the clocking frequency $f_{CK1}$. The current control loop selects a clocking pulse of a second width when the duty cycle is greater than the threshold duty cycle. In one embodiment, the second width is greater than the first width.

In another embodiment of the invention, the switching circuit electrically couples an input voltage to the LC circuit at a rising edge of the clocking pulse of the first width for charging the LC circuit. In one embodiment, the LC circuit is charged only during the first width of the clocking pulse when the duty cycle is equal to the predefined minimum duty cycle.

According to an embodiment of the invention, the current control loop comprises an SR latch having an output coupled to a gate of a switching transistor of the switching circuit, a current comparator coupled to a reset input R of the SR latch, and a logic circuit coupled to the set input S of the SR latch. The logic circuit includes a first input for receiving a gate voltage and a second input for receiving the clocking pulse of the first width. In one embodiment, the logic circuit selects as an adaptive clocking pulse the clocking pulse of the first width when the duty cycle is less than the threshold duty cycle and a clocking pulse of the second width when the duty cycle is greater than the threshold duty cycle. In one embodiment, the set input S receives the adaptive clocking pulse for clocking on the switching transistor. The switching transistor is coupled to an input voltage.

In another embodiment of the invention, the current comparator compares an error control current representative of an output voltage of the DC-DC converter with a sense current representative of current in the gated switching transistor and generates a comparator output voltage pulse based upon the comparison. The comparator output voltage pulse is received by the R input for switching off the gated switching transistor. In one embodiment, the second width is greater than a reset time of the current comparator, where the reset time is equivalent to a width of the comparator output voltage pulse.

According to an embodiment of the invention, a method is provided for adapting a clocking pulse width for clocking a DC-DC converter based upon a duty cycle of the DC-DC converter. In one embodiment, the method comprises clocking on a switching transistor with a first clocking pulse at time t1, clocking off the switching transistor at time t2, comparing the time interval t2–t1 with a predefined time interval, and selecting a width of a second clocking pulse for clocking on the switching transistor at time t3, where the selection is based upon the comparison. In an embodiment of the invention, the switching transistor is coupled to an LC circuit of the DC-DC converter and an input voltage. In another embodiment, the predefined time interval is related to a predefined threshold duty cycle and a clocking frequency $f_{CK1}$.

In another embodiment of the invention, selecting the width of the second clocking pulse comprises selecting a first width for the second clocking pulse if the time interval t2–t1 is less than the predefined time interval and selecting a second width for the second clocking pulse if the time interval t2–t1 is greater than the predefined time interval. In one embodiment, the first width is less than the second width.

BRIEF DESCRIPTION OF THE DRAWINGS

These and other advantages, aspects and novel features of the present invention, as well as details of an illustrated embodiment thereof, will be more fully understood from the following description and drawings.

DETAILED DESCRIPTION OF ILLUSTRATIVE EMBODIMENTS

Figure 1:
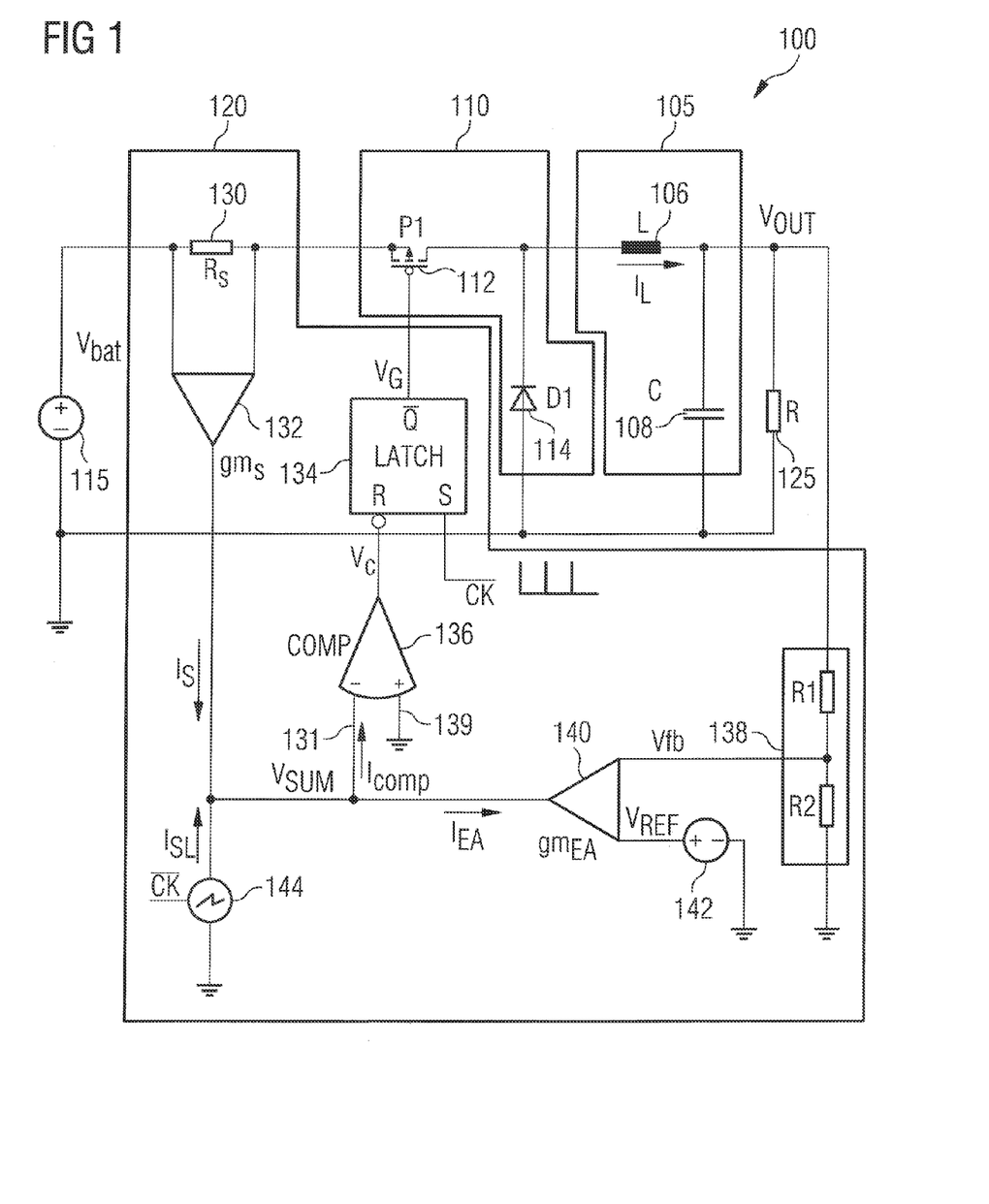
FIG. 1 is a schematic diagram of a conventional pulse width modulation (PWM) Buck converter.

FIG. 1 is a schematic diagram of a conventional pulse width modulation (PWM) Buck converter 100. The conventional PWM Buck converter 100 includes an LC circuit 105 comprising an inductor 106 and a load capacitor 108, a switching circuit 110 comprising a switching transistor 112 and a diode 114, a DC voltage source 115, a current control loop 120 and a load resistor 125. The DC voltage source 115 provides an input voltage (Vbatt). As known to one of skill in the art, the conventional converter 100 steps down the input voltage Vbatt to generate an output voltage Vout as measured across the load resistor 125. A clock signal CK clocks the conventional converter 100 at a frequency $f_{CK}$. The duty cycle (DC) of the conventional converter 100, defined as the on-time of the switching transistor 112 (during which time load capacitor 108 is charged) divided by the period $T_{CK}$ of the clock signal CK, is equal to the output voltage divided by the input voltage, Vout/Vbatt.

As illustrated, the switching transistor 112 is a p-channel MOSFET device (i.e., a PMOS). During a first portion of the clock signal period $T_{CK}$ when the load capacitor 108 is being charged, the switching transistor 112 is in a conducting state (i.e., switched on) and the diode 114 is reverse biased. During a second portion of the clock signal period $T_{CK}$ when the load capacitor 108 is being discharged, the switching transistor 112 is in a non-conducting state (i.e., switched off) and the diode 114 is forward biased.

The current control loop 120 includes a current sensing resistor 130, a sensing current amplifier 132, a latch 134, a current comparator 136, a voltage divider 138, an error control current amplifier 140, a reference voltage 142 and a loop stability current source 144. As illustrated, the voltage divider 138 includes a resistor R1 coupled in series with a resistor R2. The current comparator 136 generates a comparator output voltage Vc based upon a comparison of an error control current $I_{EA}$ (dependent upon the output voltage Vout) with a sense current $I_S$ (dependent upon the charging current in the inductor 106). The latch 134 is clocked by an inverse of the comparator output voltage Vc and the clock signal CK to generate a latch output signal Q bar. The latch provides an inverse of the latch output signal Q bar (i.e., a gate voltage signal Vg) to the switching transistor 112. The gate voltage signal Vg controls the conducting state of the switching transistor 112, thereby providing stable operation given a predefined duty cycle.

In operation, a set input S of the latch 134 receives the clock signal CK and a reset input R of the latch 134 receives the inverse of the comparator output voltage Vc. When S receives a pulse of the clock signal CK while R is low, the latch output signal Q bar is forced low and the switching transistor 112 is switched on. When the inverse of the comparator output voltage Vc is pulsed while S is low, the latch output signal Q bar is forced high and the switching transistor 112 is switched off. When the switching transistor 112 is switched on, (i.e., switched to a conducting state), the conventional converter 100 is in a charging state. When the switching transistor 112 is switched off, (i.e., switched to a non-conducting state), the conventional converter 100 is in a discharging state. In the charging state, the diode 114 is reverse biased and a current $I_L$ flows in the sensing resistor Rs 130, the switching transistor 112 and the inductor 106. In the discharging state the diode 114 is forward biased, thereby allowing the current $I_L$ to continue to flow in the inductor 106 based upon stored electromagnetic energy in the inductor 106 and the load capacitor 108. In the charging state, the current $I_L$ increases with time. In the discharging state, the current $I_L$ typically decreases with time. However, if during the discharging state the current $I_L$ goes to zero, the conventional converter 100 operates in a discontinuous mode.

The voltage divider 138 is coupled to the error control current amplifier 140. The voltage divider 138 divides the output voltage Vout to generate a voltage Vfb received by the error control current amplifier 140. The error control current amplifier 140 generates an error control current $I_{EA}$ based upon a difference between the reference voltage Vref and the voltage Vfb, where $I_{EA}=gm_{EA}*(Vref-Vfb)$ and $gm_{EA}$ is the transconductance of the error control current amplifier 140. The sensing current amplifier 132 generates the sensing current $I_S$ whenever the current $I_L$ flows in the sensing resistor Rs, where $I_S=gm_S*Rs*I_L$ and $gm_S$ is the transconductance of the sensing current amplifier 132. The current $I_L$ flows in the sensing resistor Rs whenever the switching transistor 112 is switched on (i.e., whenever conventional converter 100 is in the charging state).

The loop stability current source 144 generates a loop stability current $I_{SL}$. The loop stability current source 144 is controlled by an inverse of the clock signal CK (i.e., CK bar). In operation, when the clock signal CK is low, CK bar is high and the stability current source is clocked on. In an on-state, the loop stability current source 144 generates a monotonically increasing current $I_{SL}$. Conversely, when CK is high, the stability current source 144 is clocked off and the current $I_{SL}$ goes to zero. As illustrated, the loop stability current source 144 receives a control signal (i.e., CK bar) and generates a saw-tooth loop stability current $I_{SL}$.

The current comparator 136 includes a negative input node 137 and a positive input node 139. The positive input node 139 is couple to ground. As illustrated, $I_{COMP}$ is defined to be a current flowing into the current comparator 136 at the negative node 137. In operation, the current comparator 136 generates the comparator output voltage Vc based upon a comparison of the currents in the positive and negative input nodes 139 and 137. For example, Vc is forced high when $I_{COMP}$ is negative (i.e., when current flows out of the comparator 136 at the negative node 137) and Vc is forced low when $I_{COMP}$ is zero or positive (i.e., when current flows into the comparator 136 at the negative node 137 or when current is zero at the negative node 137).

When the switching transistor 112 is initially switched on, the sum of $I_S$ and $I_{SL}$ is typically less than $I_{EA}$, and consequently $I_{COMP}$ is negative thereby forcing Vc to a high state. When Vc is high, the reset input R is low. During the time that the switching transistor 112 remains switched on, both $I_{SL}$ and $I_S$ increase until $I_{SL}+I_S=I_{EA}$. When $I_{SL}+I_S=I_{EA}$, $I_{COMP}$ is zero, forcing Vc to a low state. When Vc is low, the reset input R is high.

Figure 2:
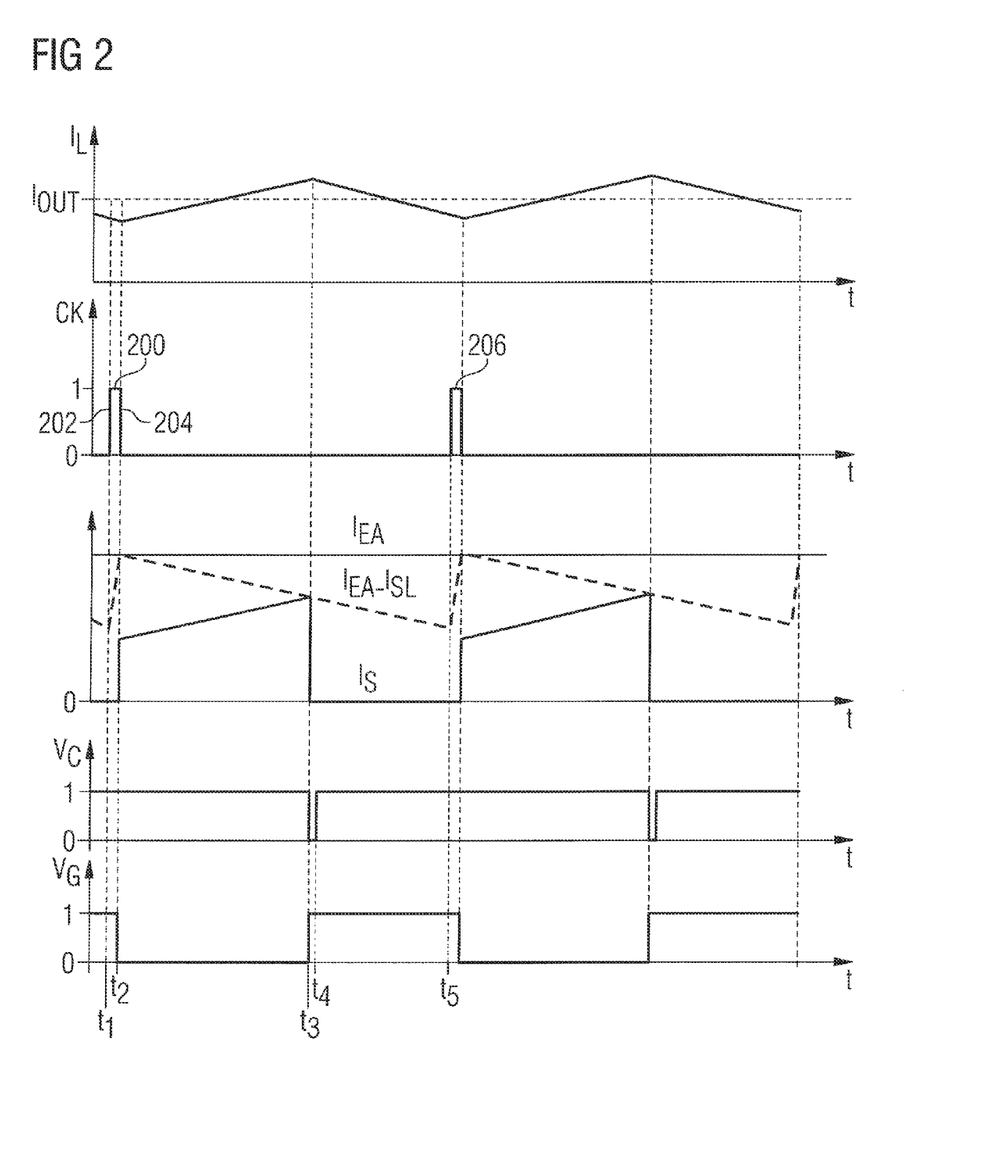
FIG. 2 illustrates conventional waveforms associated with operation of the conventional PWM Buck converter of FIG. 1.

FIG. 2 illustrates the conventional waveforms associated with operation of the conventional PWM Buck converter 100 of FIG. 1. For example, a first clocking pulse 200 of the clock signal CK is received by the set input S of the latch 134. When a leading edge 202 of the first clocking pulse 200 goes from a low to a high at time t1, the loop stability current source 144 is clocked off, forcing the loop stability current $I_{SL}$ to zero as illustrated by the $I_{EA}$-$I_{SL}$ curve. When a trailing edge 204 of the first clocking pulse 200 goes from a high to a low at time t2 when the comparator voltage Vc is high (i.e., when the reset input R is low), the gate voltage Vg is forced low thereby clocking the switching transistor 112 on (i.e., placing the switching transistor 112 in a conducting state) and generating a sense current $I_S$ that increases as the inductor current $I_L$ increases. In addition, the loop stability current source 144 is clocked on at time t2, and $I_{SL}$ increases as illustrated by the $I_{EA}$-$I_{SL}$ curve. During the time period from t2 to t3, the switching transistor 112 is on and $I_L$, $I_S$ and $I_{SL}$ increase.

At time t3, $I_{EA}=I_{SL}+I_S$, and the comparator output voltage Vc goes from a high to a low state. The inverse of the comparator output voltage Vc is received by the reset input R of the latch 134. Thus, the reset input R goes from a low to a high state while the set input S is low (i.e., while CK is low), thereby forcing Q bar high and forcing the gate voltage Vg of the switching transistor 112 high. The switching transistor 112 is switched off, the sensing current $I_S$ goes to zero and the inductor current $I_L$ decreases.

At time t4, the comparator output voltage Vc goes from a low to a high. The time t4−t3 is defined as a reset time of the current comparator 136. At time t5, a second clocking pulse 206 of the clocking signal CK is received by the set input S of the latch 134, thereby completing a first charge/discharge cycle (also referred to as a clocking period or clocking cycle) of the conventional converter 100. As illustrated by the $I_{EA}$-$I_{SL}$ curve, the loop stability current $I_{SL}$ continues to increase until the loop stability current source 144 is clocked off at time t5 when CK bar goes from a high to a low state.

Figure 3:
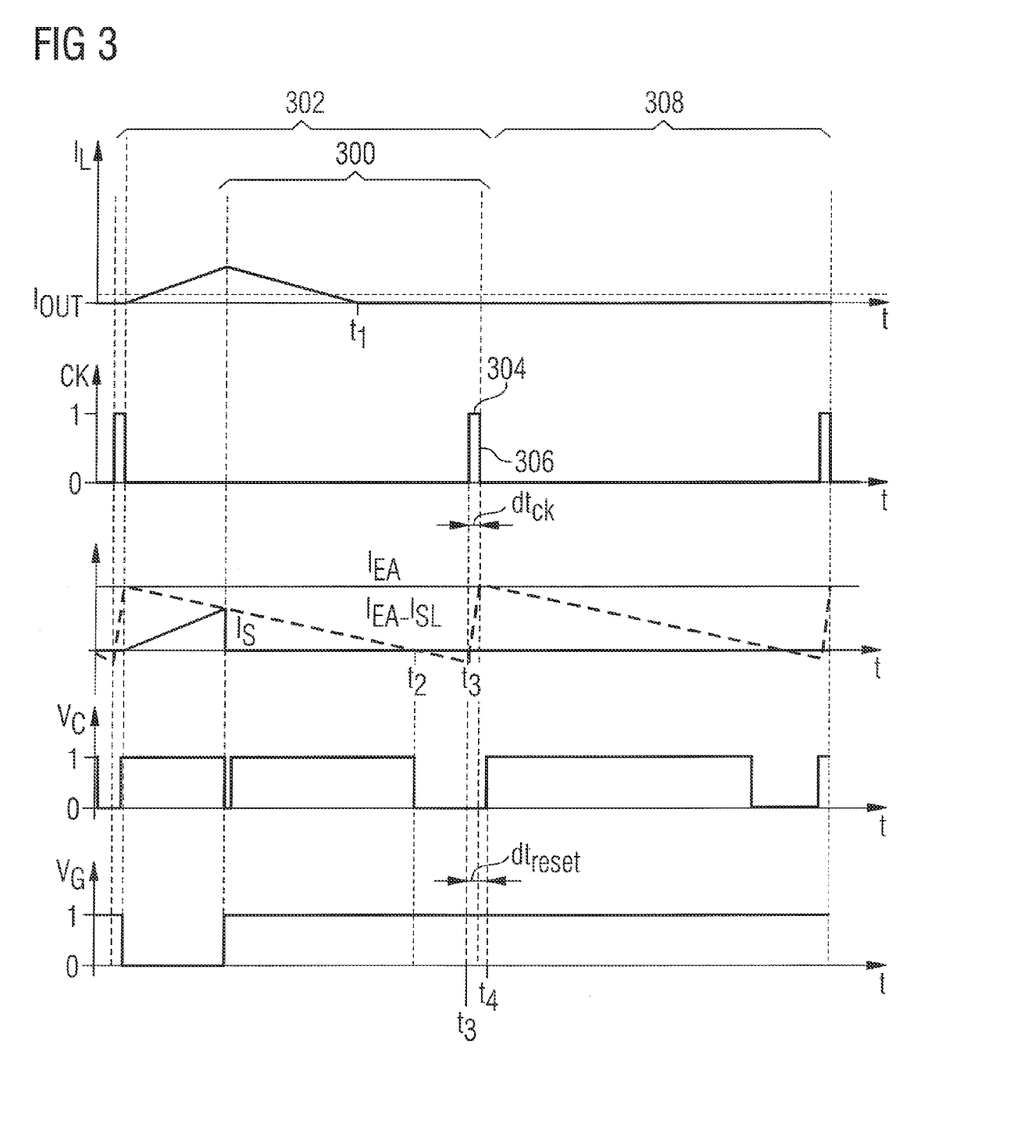
FIG. 3 illustrates current pulse skipping when the conventional PWM Buck converter of FIG. 1 is operated at a low duty cycle in a discontinuous mode.

FIG. 3 illustrates current pulse skipping when the conventional PWM Buck converter 100 of FIG. 1 is operated at a low duty cycle in a discontinuous mode. The conventional converter 100 operates in discontinuous mode since the inductor current $I_L$ falls to zero at time t1 during a discharge portion of a clocking cycle.

As known to one of skill in the art, as the conventional converter 100 is operated at higher duty cycles, the output voltage Vout approaches the input voltage Vbatt and the peak current through the inductor decreases. As the output voltage Vout increases, the voltage Vfb increases and consequently the error control current $I_{EA}$ decreases. Thus, as illustrated, the effect of operating at a low duty cycle is the intersection of the $I_{EA}$-$I_{SL}$ curve with the t-axis at time t2 during a discharge phase 300 of a first clocking cycle 302. Since $I_{EA}=I_{SL}+I_S$ at t2, the comparator output voltage Vc goes from a high to a low. Between time t2 and t3, $I_{SL}$ is greater than $I_{EA}$ and the comparator output voltage VC is held low. In addition, the comparator 136 requires a reset time $dt_{reset}$=t4−t3 to change the comparator output voltage Vc from a low to a high after the current $I_{COMP}$ flowing into the comparator 136 at the negative node 137 changes direction at time t3.

As illustrated, since the comparator reset time $dt_{reset}$ is greater than the width $dt_{CK}$ of a clocking pulse 304, a trailing edge 306 of the clocking pulse 304 goes from a high to a low while the comparator output voltage Vc is low (i.e., when the reset input R is high). Consequently, the latch output voltage Q bar does not change states, the gate voltage Vg remains high, the switching transistor 112 remains in a non-conducting switched-off state, and the inductor current $I_L$ remains zero during the second clocking cycle 308. In effect, the conventional converter 100 skips an inductor current pulse during the second clocking cycle 308.

Figure 4:
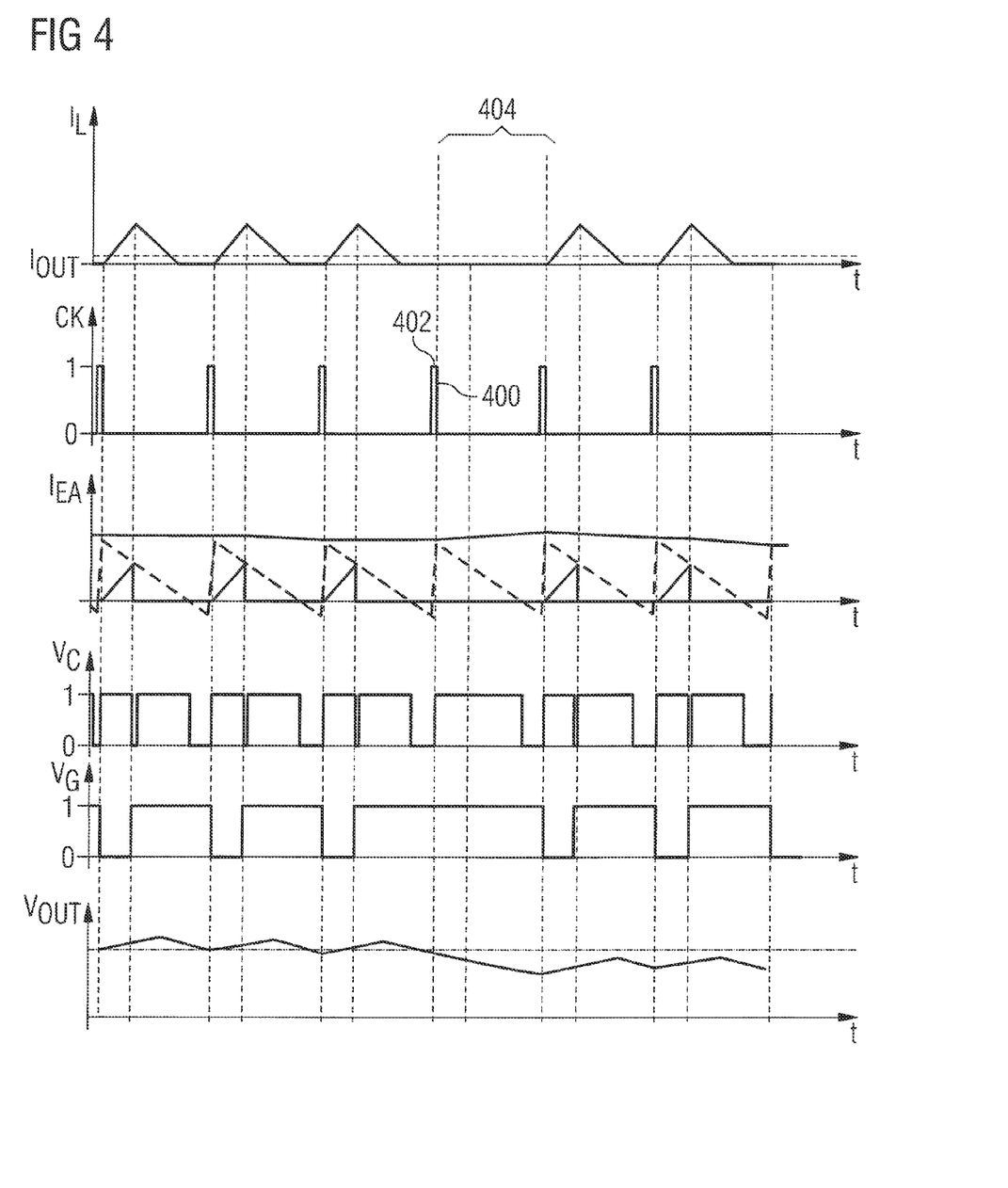
FIG. 4 illustrates the effect of current pulse skipping over several clocking cycles when the conventional PWM Buck converter of FIG. 1 is operated at a high duty cycle in a discontinuous mode.

FIG. 4 illustrates the effect of current pulse skipping over several clocking cycles when the conventional PWM Buck converter 100 of FIG. 1 is operated at a high duty cycle in a discontinuous mode. As illustrated, a trailing edge 400 of a fourth clocking pulse 402 of the clock signal CK goes from a high to a low state while the comparator output voltage Vc is low (i.e, while the reset input R of the latch 134 is high). The reset speed of the comparator 136 is too slow to allow the comparator output voltage Vc to switch from a low to a high state before the fourth clocking pulse ends (i.e, before the trailing edge 400 of the fourth clocking pulse 402 goes from a high to a low state). As a result, the switching transistor 112 remains switched off during a fourth clocking cycle 404 and an inductor current pulse is skipped.

As a result of skipping a current pulse, the average output voltage Vout decreases, the voltage Vfb received by the error control current amplifier 140 decreases, and the error control current $I_{EA}$ increases. The increase in the error control current $I_{EA}$ typically causes the current control loop 120 to restore the inductor current pulses during subsequent clocking cycles, leading to an increase in the output voltage Vout. However, as the output voltage Vout and the error current $I_{EA}$ approach their designed values during subsequent clocking cycles, another current pulse may be skipped. The periodic skipping of inductor current pulses generates sub-harmonic oscillations in the output current Iout, output voltage Vout and error control current $I_{EA}$.

Figure 5:
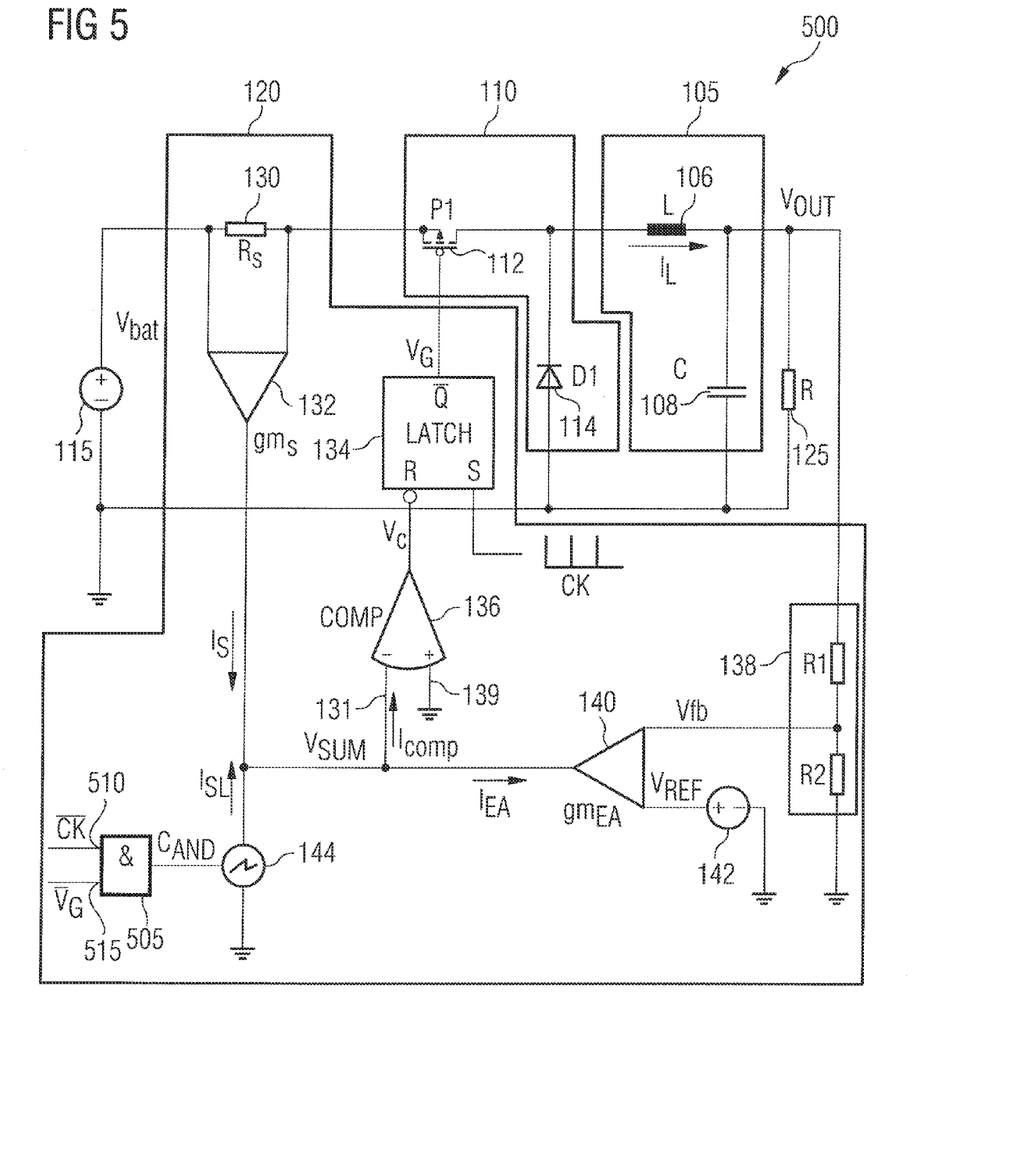
FIG. 5 is a schematic diagram of a second conventional PWM Buck converter.

FIG. 5 is a schematic diagram of a second conventional PWM Buck converter 500. The second conventional PWM Buck converter 500 is similar to the conventional converter 100 illustrated in FIG. 1, where like reference labels refer to like elements. As illustrated, the loop stability current source 144 is controlled by an AND gate 505. The AND gate 505 has a first input 510 for receiving the inverse of the clock signal, CK bar, and a second input 515 for receiving the inverse of the gate voltage, Vg bar. The AND gate 505 performs a logical conjunction of Vg bar and CK bar to generate a control signal $C_{AND}$ for controlling the loop stability current source 144. When the control signal $C_{AND}$ is high, the stability current source 144 is clocked on, generating a monotonically increasing loop stability current $I_{SL}$. When the control signal is low, the stability current source is clocked off and $I_{SL}$ goes to zero. The stability current source 144 is turned on only when the clock signal CK and the gate voltage Vg are low.

Figure 6:
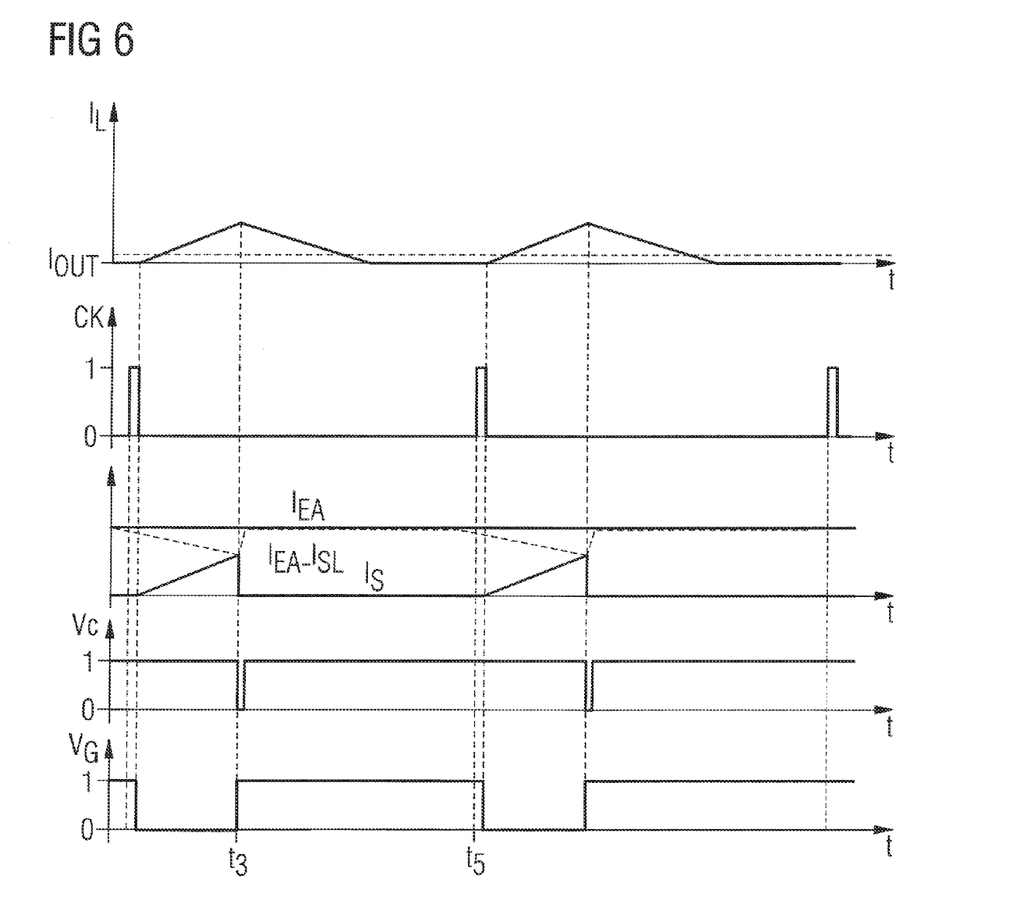
FIG. 6 illustrates conventional waveforms of the second conventional PWM Buck converter of FIG. 5 operated at low output current levels.

FIG. 6 illustrates conventional waveforms of the second conventional PWM Buck converter 500 of FIG. 5 operated at low output current levels. In contrast to FIG. 2, the loop stability current source 144 is clocked off and $I_{SL}$ is zero between times t3 and t5. Thus, the $I_{EA}$-$I_{SL}$ curve does not intersect the t-axis during discharge phases of the clocking cycles, thereby avoiding inductor current pulse skipping and sub-harmonic generation. However, although the addition of the AND gate 505 to clock the loop stability current source 144 may avoid the generation of sub-harmonic oscillations under some operating conditions, sub-harmonics will still be generated when the conventional converter 500 is operated at very high duty cycles and low output current levels, as illustrated in FIG. 7.

Figure 7:
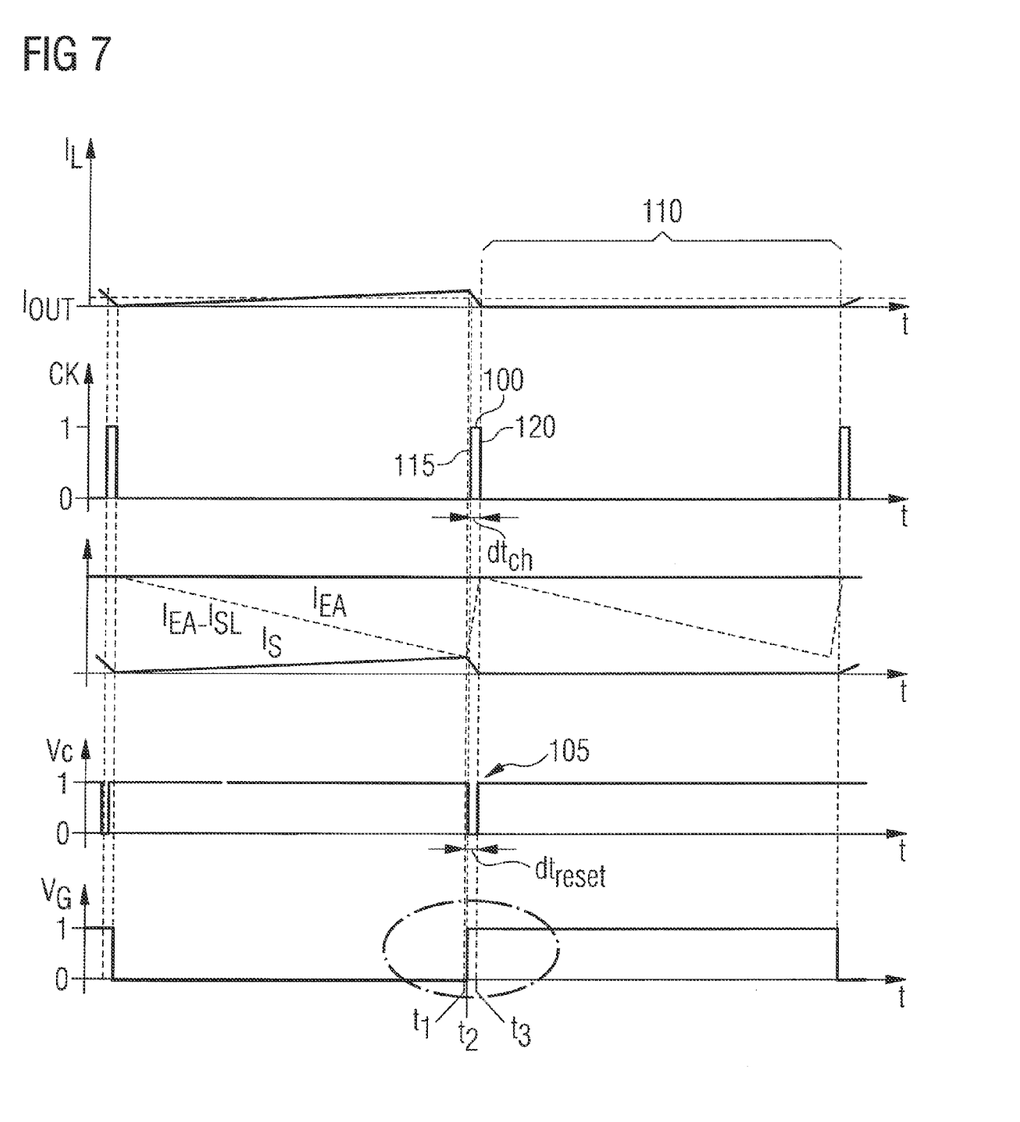
FIG. 7 illustrates current pulse skipping when the second conventional PWM Buck converter of FIG. 5 is operated at high duty cycles.

FIG. 7 illustrates current pulse skipping when the second conventional PWM Buck converter 500 of FIG. 5 is operated at high duty cycles. As illustrated, in order to achieve a very high duty cycle, a second clocking pulse 700 of the clock signal CK occurs nearly simultaneously with a pulse 705 of the comparator output voltage Vc. However, as shown, a reset time $dt_{reset}$ of the current comparator 136 is less than a width $dt_{CK}$ of the second clocking pulse 700. The switching transistor 112 is not switched on during a second clocking cycle 710, and as a result, an inductor current pulse is skipped during the second clocking cycle 710.

More specifically, at time t1, $I_{EA}=I_{SL}+I_S$. As a result, the comparator output voltage VC goes from a high to a low state enabling the latch output voltage Q bar to change states, thereby forcing the gate voltage Vg high and consequently switching off the switching transistor 112 and the stability current source 144.

At time t2, a leading edge 715 of the second clocking pulse 700 of the clock signal CK goes from a low to a high. At time t3 a trailing edge 720 of the second clocking pulse 700 of the clock signal CK goes from a high to a low state. However, at time t3 the comparator output voltage Vc is still low, and thus the second clocking pulse 700 does not enable the latch 134 to change state of the latch output voltage Q bar. In effect, the gate voltage Vg remains high, the switching transistor 112 remains in a non-conducting off state, and the inductor current $I_L$ is zero during the second clocking cycle 710 (i.e., an inductor current pulse is skipped).

Given a conventional DC-DC converter, such as conventional converter 100 illustrated in FIG. 1, the current-voltage relationship for the inductor 106 is $V=L\ dI_L/dt$. The ripple in the inductor current is $dI_L=(Vbatt-Vout)*ton/L$, where ton is the time that the switching transistor 112 is switched on during one clocking cycle. In this calculation, the small voltage drops across the sensing resistor $R_S$ 130 and the switching transistor 112 are ignored. The current-voltage relationship for the load capacitor is $C\ dVout/dt=I_L(t)$. Thus, the voltage ripple across the load capacitor is $dV_{out}=1/C$ Int $I_L(t)dt=1/LC$ Int $((Vbatt-Vout)*t)dt=(Vbatt-Vout)*ton**2/2LC$. Since $DC=ton/T_{CK}=ton*f_{CK}$, $ton=DC/f_{CK}$, where DC is the duty cycle. Substituting for ton, the expression for the output voltage ripple is $dV_{out}=(Vbatt-Vout)*DC2/2LC\ f_{CK}2$. In order to increase performance and reduce component costs for a DC-DC converter, it is desirable to decrease the size of the LC product. However, as can be seen from the above expression, as LC decreases the clocking frequency $f_{CK}$ must be increased in order to prevent the output voltage ripple $dV_{out}$ from increasing. Thus, it is desirable to operate a DC-DC converter at high clocking frequencies while also avoiding sub-harmonic oscillations and current pulse skipping at high duty cycle levels.

Figure 8:
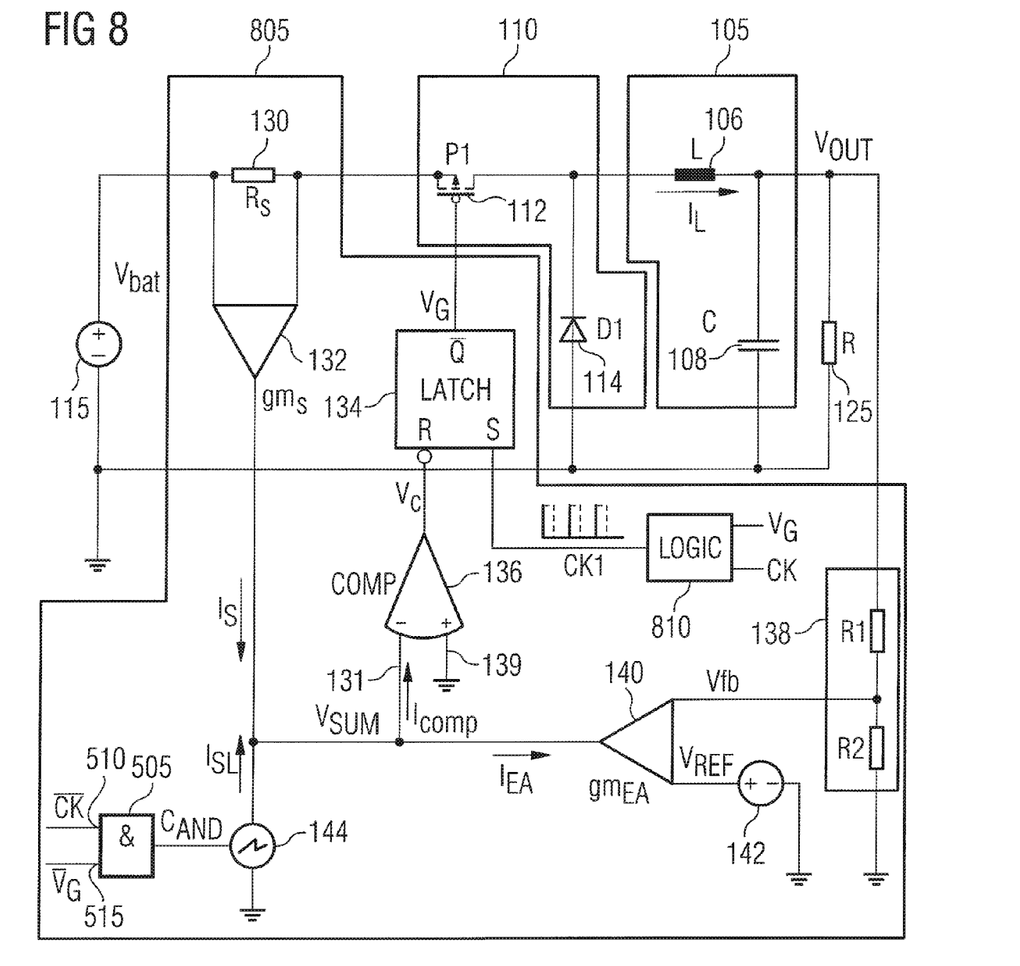
FIG. 8 is a schematic diagram of an adaptive PWM DC-DC converter, according to an embodiment of the present invention.

FIG. 8 is a schematic diagram of an adaptive PWM DC-DC converter 800, according to an embodiment of the present invention. Like reference labels in FIGS. 8 and 5 refer to like elements.

As illustrated, the adaptive PWM DC-DC converter 800 is clocked by an adaptive clock signal CK1. According to an exemplary embodiment of the present invention, decreasing a width of a clocking pulse of the adaptive clock signal CK1 (i.e., decreasing an on-time of the switching transistor 112) allows for an increase in the clocking frequency $f_{CK1}$ when operating the adaptive PWM DC-DC converter 800 at a minimum duty cycle DCmin. More specifically, given a predefined clocking frequency $f_{CK1}$ selected to keep the output voltage ripple within design specifications based upon a given value of inductance for the inductor 106 and a given value of capacitance for the load capacitor 108, and given a predefined minimum duty cycle DCmin, a first clocking pulse width $dt_{1pulse}$ is selected according to the following relationship: $dt_{1pulse}=DCmin/f_{CK1}$. Selecting $dt_{1pulse}$ according to the above relationship allows the adaptive DC-DC converter 800 to be operated within design specifications for output voltage ripple at the minimum duty cycle DCmin. As illustrated further below in FIG. 12, $dt_{1pulse}$=ton when the adaptive PWM DC-DC converter 800 is operated at DCmin, where ton is the on-time of the switching transistor 112 during a clocking cycle.

Furthermore, when the adaptive PWM DC-DC converter 800 operates at a high duty cycle, for example, at a duty cycle where the off-time of the switching transistor 112 is approximately equal to a reset time of the current comparator 136, a second clocking pulse width $dt_{2pulse}$ is selected that is greater than the reset time of the current comparator 136 in order to avoid generating missing inductor current pulses and sub-harmonic oscillations in the output voltage Vout.

Thus, according to an embodiment of the present invention, a clocking pulse width is adapted based upon the duty cycle of the adaptive PWM DC-DC converter 800. In one embodiment, the duty cycle is adjustable. The clocking pulse width is selected to be larger than a comparator reset time when operating at high duty cycles to avoid generation of sub-harmonic oscillations, but may be selected to be smaller than the comparator reset time when operating at low duty cycles in order to operate at high clocking frequencies to reduce output voltage ripple.

Referring back to FIG. 8, the adaptive PMW DC-DC converter 800 includes a current control loop 805. The current control loop 805 includes a logic circuit 810 configured to receive a clock signal CK and a gate voltage Vg and generate an adaptive clock signal CK1. The set input S of the latch 134 is coupled to the logic circuit 810 for receiving the adaptive clock signal CK1.

Figure 9:
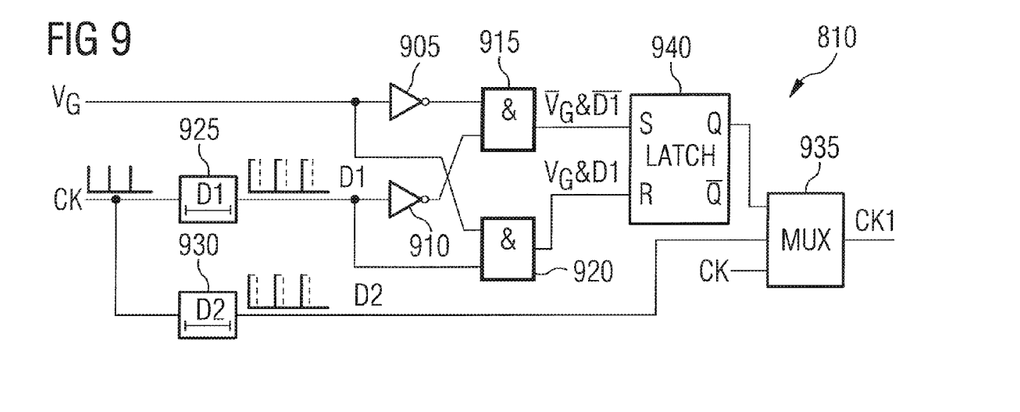
FIG. 9 is a schematic diagram of the logic circuit illustrated in FIG. 8, according to an embodiment of the present invention.

FIG. 9 is a schematic diagram of the logic circuit 810 illustrated in FIG. 8, according to an embodiment of the present invention. The logic circuit 810 includes a first inverter 905, a second inverter 910, a first AND gate 915, a second AND gate 920, a first delay 925, a second delay 930, a multiplexer 935 and an SR latch 940. The first inverter 905 and the second AND gate 920 are coupled to the switching transistor 112 for receiving a gate voltage Vg, the first delay 925 and second delay 930 receive the clock signal CK, and the multiplexer 935 is coupled to the second delay 930 for receiving a delayed clock signal D2 generated by the second delay 930 and to a Q output of the latch 940. In addition, the multiplexer 935 receives the clock signal CK. Based upon the Q output of the latch 940, the multiplexer 935 selects either the delayed clock signal D2 or the clock signal CK as the adaptive clock signal CK1. The first delay 925 and second delay 930 increase widths of clocking pulses of the clock signal CK. For example, as illustrated in FIG. 10, $dt_{CK} < dt_{D2} < dt_{D1}$.

Referring back to FIG. 9, when the gate voltage Vg and delayed clock signal D1 are high, the R input is high and the S input is low. As a result, the Q output of the latch 940 is low. When the Q output is low, the multiplexer 935 selects CK1=CK. However, when the gate voltage Vg and delayed clock signal D1 are low, the R input is low and the S input is high. As a result, the Q output of the latch 940 is high. When the Q output is high, the multiplexer selects CK1=D2. Further operation of the logic circuit 810 is explained below in conjunction with FIG. 10.

Figure 10:
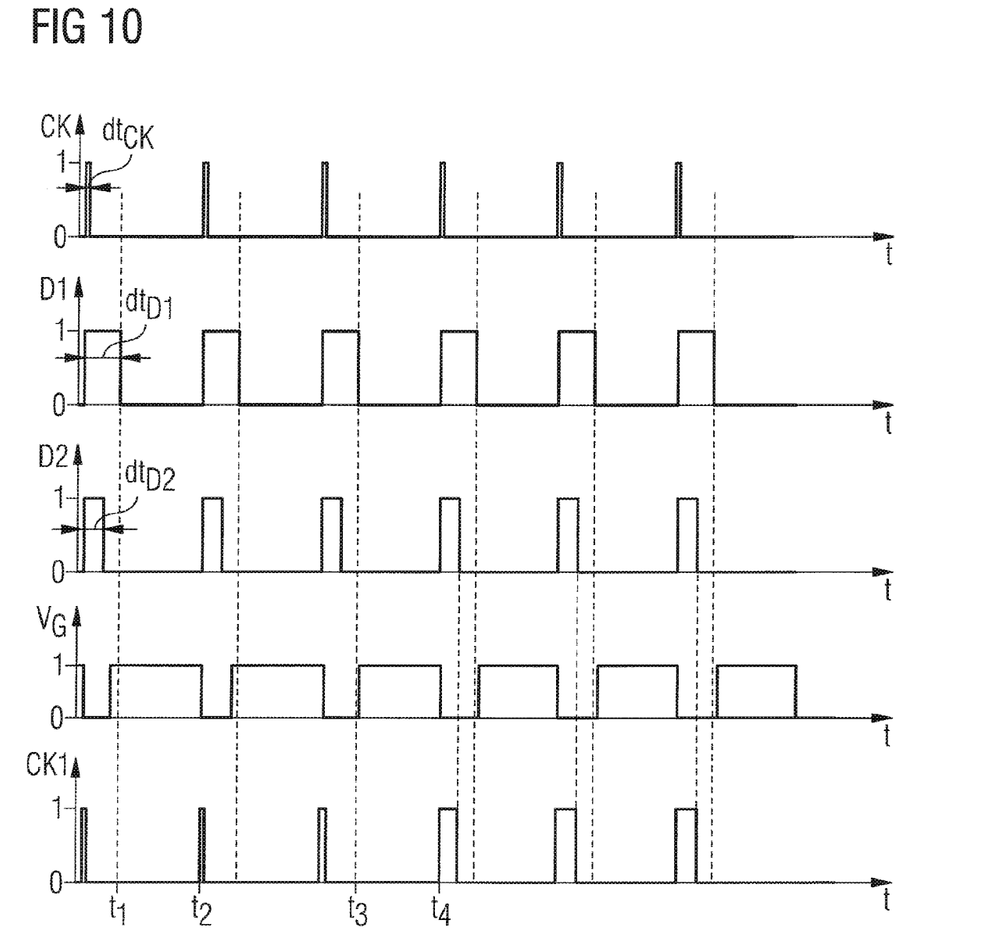
FIG. 10 illustrates waveforms associated with the adaptive PWM DC-DC converter of FIG. 8, according to an embodiment of the present invention.

FIG. 10 illustrates waveforms associated with the adaptive PWM DC-DC converter 800 of FIG. 8, according to an embodiment of the present invention. The logic circuit 810 selects either CK1=CK or CK1=D2 based upon a comparison of a width of Vg while in a low state (i.e., a width of a Vg pulse) with the width $dt_{D1}$ of a clocking pulse of the delayed clock signal D1. The width of Vg while in a low state represents the time that the switching transistor 112 is in a conducting state during a clocking cycle. For a given clocking frequency $f_{CK1}$, a threshold duty cycle ($DC_{thresh}$) is the duty cycle corresponding to the switching transistor 112 being in a conducting state for a period of time equal to the width $dt_{D1}$ of a clocking pulse of the delayed clock signal D1. According to one embodiment of the invention, when the duty cycle is less than the duty cycle threshold, the logic circuit 810 selects CK1=CK to enable the adaptive PWM DC-DC converter 800 to be clocked at high frequencies to minimize ripples in the output voltage Vout.

As illustrated during the first two clocking cycles, the period of time that the gate voltage Vg is low (i.e., the period of time that the switching transistor 112 is in an conducting state) is less than the width $dt_{D1}$ of the clocking pulses of the delayed clock signal D1, and the logic circuit 810 selects CK1=CK. For example, at time t1, Vg and D1 are both high and the Q output of the latch 940 is set low. A low Q enables the multiplexer 935 to select CK1=CK, applicable at a start of the next clocking cycle at time t2.

As illustrated during the third through sixth clocking cycles, the period of time that the switching transistor 112 is switched on (i.e., in a conducting state) is greater than the width $dt_{D1}$ of clocking pulses of the delayed clock signal D1, and the logic circuit 810 selects CK1=D2. More specifically, when the duty cycle is greater than the duty cycle threshold, the logic circuit 810 selects CK1=D2 to avoid skipping inductor current pulses. For example, at time t3, Vg and D1 are both low, and thus the Q output of the latch 134 is set high, thereby enabling the multiplexer 935 to select CK1=D2 applicable at the start of the next switching cycle at time t4.

Figure 11:
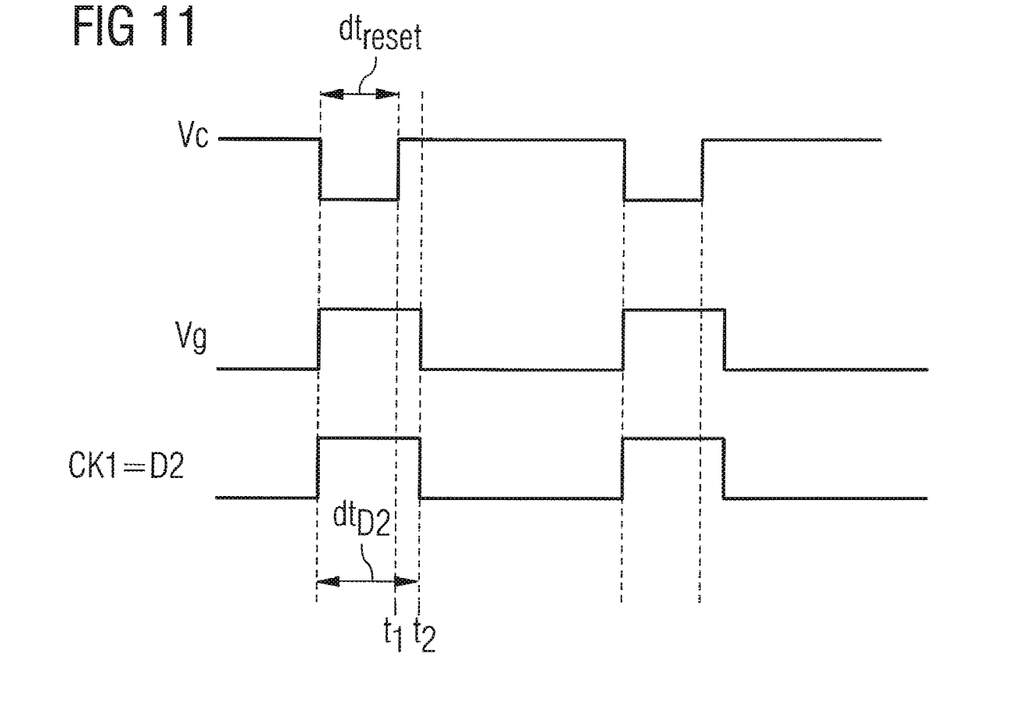
FIG. 11 illustrates waveforms associated with operation of the adaptive PWM DC-DC converter of FIG. 8 at very high duty cycles, according to an embodiment of the present invention.

FIG. 11 illustrates waveforms associated with operation of the adaptive PWM DC-DC converter 800 of FIG. 8 at very high duty cycles, according to an embodiment of the present invention. As discussed above in conjunction with FIG. 10, when operating at duty cycles greater than the threshold duty cycle, the logic circuit 810 selects CK1=D2. As illustrated, the width $dt_{D2}$ is greater than the reset time of the comparator $dt_{RESET}$, where $dt_{RESET}$ is the time required for the comparator output voltage Vc to go from a low state to a high state. More specifically, when D2 is used to clock the set input S of the latch 134, the comparator 136 resets to a high state at time t1 before a D2 clocking pulse goes from a high to a low state at time t2. Using D2 to clock the S input of the latch 134 when operating the adaptive PWM DC-DC converter 800 at duty cycles greater than the threshold duty cycle prevents the adaptive PWM DC-DC converter 800 from skipping inductor current pulses and generating sub-harmonic oscillations in the output voltage Vout.

Figure 12:
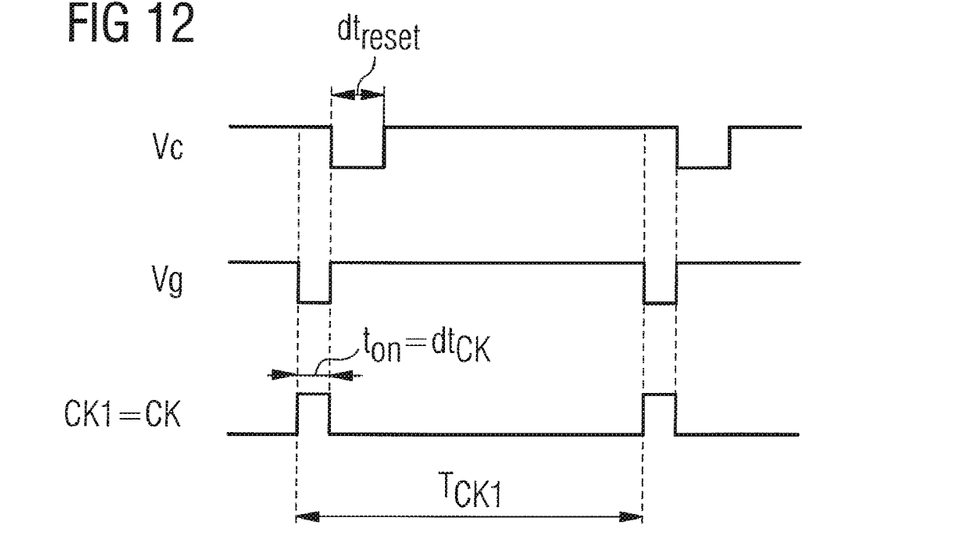
FIG. 12 illustrates waveforms associated with operation of the adaptive PWM DC-DC converter of FIG. 8 at a minimum duty cycle DCmin, according to an embodiment of the invention.

FIG. 12 illustrates waveforms associated with operation of the adaptive PWM DC-DC converter 800 of FIG. 8 at a minimum duty cycle DCmin, according to an embodiment of the invention. As discussed above in conjunction with FIG. 10, when operating at duty cycles less than the threshold duty cycle, the logic circuit 810 selects CK1=CK, where the width ton of a CK clocking pulse is less than the width $dt_{D2}$ of a D2 clocking pulse. In one embodiment, the CK clocking pulse width ton is less than the comparator reset time $dt_{RESET}$. Since the switching transistor 112 is in a conducting state (i.e., switched on) only during the width of a CK clocking pulse, the minimum duty cycle is $DCmin = ton/T_{CK1} = ton \cdot f_{CK1}$. Therefore, for a given DCmin, making the clocking pulse width ton smaller allows the adaptive PWM DC-DC converter 800 to be operated at higher clocking frequencies $f_{CK1}$. Operating the adaptive converter 800 at higher clocking frequencies reduces the output voltage ripple for a given LC value, or alternatively allows for smaller LC values for a given output voltage ripple.

The adaptive method of selecting narrow clocking pulses (i.e., CK1=CK) when the adaptive PWM DC-DC converter 800 is operated at duty cycles below the threshold duty cycle and selecting wider clocking pulses (i.e., CK1=D2) when the adaptive PWM converter 800 is operated at duty cycles above the threshold duty cycle enables the adaptive converter 800 to be operated at high switching frequencies while simultaneously preventing the generation of sub-harmonic oscillations at high duty cycles.

Figure 13:
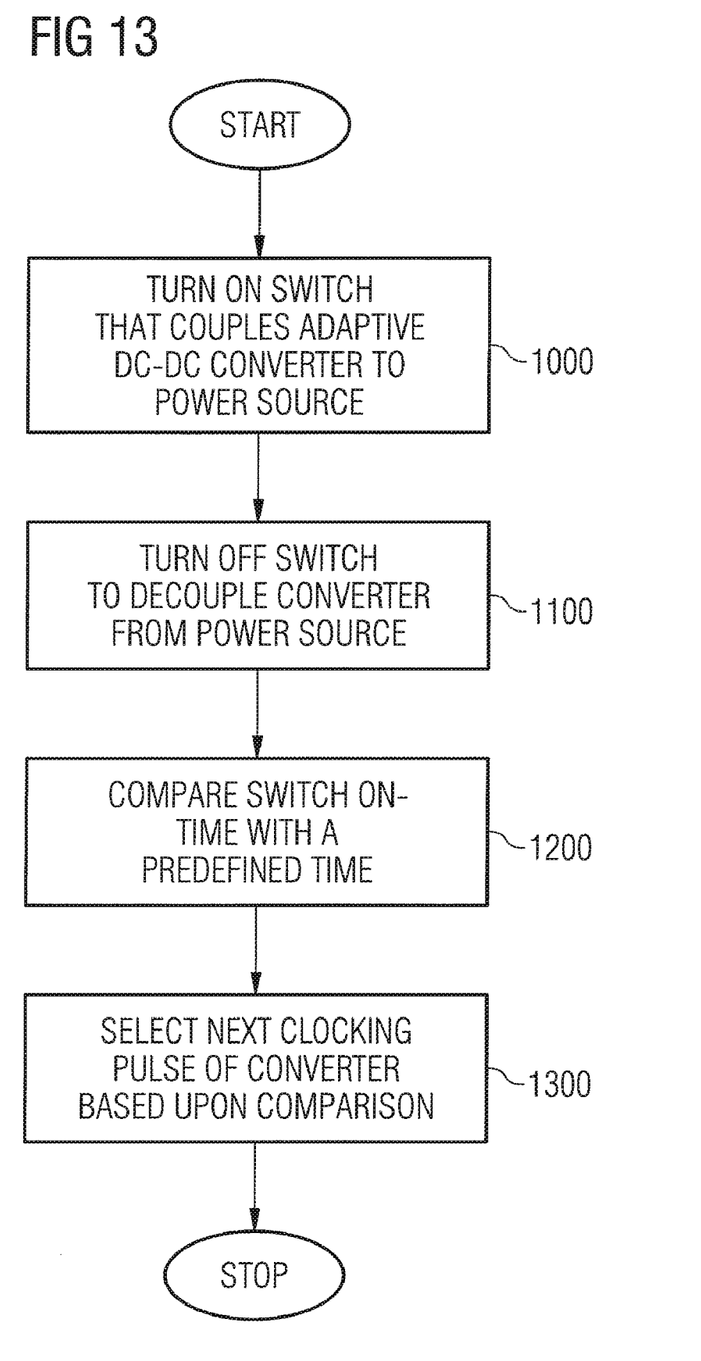
FIG. 13 is a flowchart of exemplary method steps for adapting clocking pulses to clock the adaptive PWM DC-DC converter illustrated in FIG. 8, according to an embodiment of the present invention.

FIG. 13 is a flowchart of exemplary method steps for adapting clocking pulses to clock the adaptive PWM DC-DC converter 800 illustrated in FIG. 8, according to an embodiment of the present invention. At step 1000, a switch 112 that couples the adaptive PWM DC-DC converter 800 to a power source 115 is turned on at time t1 by a clocking pulse of a first width. Alternatively, the switch is turned on at time t1 by a clocking pulse of a second width, where the second width is greater than the first width. In one embodiment, the switching transistor is a gated transistor, such as a PMOS device, for example.

At step 1100, a control loop 805 of the adaptive DC-DC converter 800 turns the switch 112 off at time t2, decoupling the power source 115 from the adaptive DC-DC converter 800. In one embodiment, the control loop 805 is a current control loop having a current comparator 136 that compares a sense current $I_S$ that is representative of the current in the adaptive DC-DC converter 800 to an error control current $I_{EA}$ that is representative of the duty cycle of the adaptive DC-DC converter 800. In one embodiment of the present invention, the duty cycle may be set in the range between a predefined minimum duty cycle and a maximum duty cycle. In one embodiment, the minimum duty cycle is dependent upon a clocking frequency of the converter and the first width of the clocking pulse. In another embodiment, the maximum duty cycle is depended upon a reset time $dt_{RESET}$ of the comparator 136 and the clocking frequency.

At step 1200, the transistor "on" time (i.e., t2−t1) is compared to a predefined time. In one embodiment, the predefined time is related to a threshold duty cycle given a specified clocking frequency. At step 1300, a logic circuit 810 of the converter 800 selects a clocking pulse to clock the converter 800 at the next clocking cycle. In one embodiment, if the transistor "on" time is less than the predefined time, then a logic circuit 810 of the converter 800 selects the clocking pulse of the first width to turn on the switch 112 during the next clocking cycle. However, if the transistor "on" time is greater than the predefined time, then the logic circuit 810 of the converter 800 selects the clocking pulse of the second width to turn on the switch 112 during the next clocking cycle.

In one embodiment, the logic circuit 810 receives the clocking pulse of the first width and generates a first delayed D1 clocking pulse and a second delayed D2 clocking pulse, where the first width is less than a width of the second delayed D2 clocking pulse which is less than a width of the first delayed D1 clocking pulse. The logic circuit 810 compares a voltage signal Vg applied to a gate of the switching transistor 112 with the first delayed D1 clocking pulse. Based upon this comparison, the logic circuit 810 selects either a clocking pulse of the first width or the second width to clock the next cycle.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An adaptive pulse width modulation DC-DC converter, comprising:
   an LC circuit;
   a switching circuit coupled to the LC circuit; and
   a current control loop coupled to the LC circuit and the switching circuit, the current control loop configured pulse from a plurality of clocking pulses for clocking the switching circuit at a clocking frequency based upon a duty cycle of the DC-DC converter, the plurality of clocking pulses having a plurality of pulse widths, wherein the current control loop is further configured to select a clocking pulse of a first width when the duty cycle is less than a threshold duty cycle, the first width equal to a predefined minimum duty cycle divided by the clocking frequency.

2. The adaptive pulse width modulation DC-DC converter of claim 1, wherein the switching circuit is configured to electrically couple an input voltage to the LC circuit at a rising edge of the clocking pulse of the first width for charging the LC circuit.

3. The adaptive pulse width modulation DC-DC converter of claim 2, wherein when the duty cycle is equal to the predefined minimum duty cycle, the LC circuit is charged only during the first width of the clocking pulse.

4. The adaptive pulse width modulation DC-DC converter of claim 1, wherein the current control loop is further configured to select a clocking pulse of a second width when the duty cycle is greater than the threshold duty cycle, the second width greater than the first width.

5. An adaptive pulse width modulation DC-DC converter, comprising:
   an LC circuit;
   a switching circuit coupled to the LC circuit, the switching circuit comprising a gated transistor; and
   a current control loop coupled to the LC circuit and the switching circuit, the current control loop configured to select a clocking pulse from a plurality of clocking pulses for clocking the switching circuit at a clocking frequency based upon a duty cycle of the DC-DC converter, the plurality of clocking pulses having a plurality of pulse widths, wherein the current control loop comprises:
   an SR latch including a latch output, a set input and a reset input, the latch output coupled to a gate of the gated transistor for applying a gate voltage;
   a current comparator coupled to the reset input of the SR latch; and
   a logic circuit including a first input configured to receive the gate voltage, a second input configured to receive a clocking pulse of a first width, and a logic output coupled to the set input, the logic circuit configured to select as an adaptive clocking pulse the clocking pulse of the first width when the duty cycle is less than a threshold duty cycle and a clocking pulse of a second width when the duty cycle is greater than the threshold duty cycle, the adaptive clocking pulse received by the set input for switching the gated transistor on, wherein the gated transistor is coupled to an input voltage.

6. The adaptive pulse width modulation DC-DC converter of claim 5, wherein the first width is equal to a predefined minimum duty cycle divided by the clocking frequency.

7. The adaptive pulse width modulation DC-DC converter of claim 6, wherein the second width is greater than the first width.

8. The adaptive pulse width modulation DC-DC converter of claim 5, wherein the current comparator is configured to compare an error control current representative of an output voltage of the DC-DC converter with a sense current representative of current in the gated transistor and generate a comparator output voltage pulse based upon the comparison, the comparator output voltage pulse received by the reset input for switching the gated transistor off.

9. The adaptive pulse width modulation DC-DC converter of claim 8, wherein the second width is greater than a reset time of the current comparator, the reset time equal to a width of the comparator output voltage pulse.

10. The adaptive pulse width modulation DC-DC converter of claim 8, wherein the LC circuit comprises a load capacitor coupled to ground and an inductor coupling the load capacitor to the gated transistor, wherein the duty cycle is a voltage of the load capacitor divided by the input voltage.

11. The adaptive pulse width modulation DC-DC converter of claim 10, wherein the switching circuit further comprises a diode coupling the gated transistor to ground, the diode configured to provide a path for inductor current when the gated transistor is off.

12. A method for adapting a clocking pulse width for clocking a DC-DC converter based upon a duty cycle of the DC-DC converter, the method comprising:
   clocking on a switching transistor with a first clocking pulse at a time t1, the switching transistor coupled to an LC circuit of the DC-DC converter and an input voltage;
   clocking off the switching transistor at a time t2;
   comparing a time interval t2−t1 with a predefined time interval, the predefined time interval related to a predefined threshold duty cycle and a clocking frequency; and
   selecting a width of a second clocking pulse for clocking on the switching transistor at a time t3, the selection based upon the comparing.

13. The method of claim 12, wherein the predefined time interval equals the predefined threshold duty cycle divided by the clocking frequency.

14. The method of claim 12, wherein selecting the width of the second clocking pulse comprises:

if the time interval t2–t1 is less than the predefined time interval, selecting a first width for the second clocking pulse; and if the time interval t2–t1 is greater than the predefined time interval, selecting a second width for the second clocking pulse.

15. The method of claim 14, wherein the first width is less than the second width.

16. The method of claim 14, wherein the first width=$DC_{min}/f_{CK1}$, where $DC_{min}$ is a predefined minimum duty cycle of the DC-DC converter.

17. The method of claim 16, wherein when the DC-DC converter is operated at the predefined minimum duty cycle, the first width is equal to a time that the switching transistor is on during a clocking cycle $T_{CK1}=1/f_{CK1}$, where $f_{CK1}$ is the clocking frequency.

18. The method of claim 14, wherein the second width is greater than a reset time of a current comparator of the DC-DC converter.

19. The method of claim 14, wherein the second width is greater than the first width.

20. A system configured to adapt a clocking pulse width for clocking a DC-DC converter based upon a duty cycle of the DC-DC converter, the system comprising:

means for clocking on a switching transistor with a first clocking pulse at a time t1, the switching transistor coupled to an LC circuit of the DC-DC converter and an input voltage;

means for clocking off the switching transistor at a time t2;

means for comparing a time interval t2–t1 with a predefined time interval, the predefined time interval related to a predefined threshold duty cycle and a clocking frequency; and means for selecting a width of a second clocking pulse for clocking on the switching transistor at a time t3, the means for selecting based upon the means for comparing.

21. The system of claim 20, wherein the means for selecting the width of the second clocking pulse comprises:

means for selecting a first width for the second clocking pulse if the time interval t2–t1 is less than the predefined time interval and for selecting a second width for the second clocking pulse if the time interval t2–t1 is greater than the predefined time interval.

* * * * *

UNITED STATES PATENT AND TRADEMARK OFFICE
CERTIFICATE OF CORRECTION

PATENT NO.         : 8,164,319 B2                              Page 1 of 1
APPLICATION NO.    : 12/242304
DATED              : April 24, 2012
INVENTOR(S)        : Bodano et al.

It is certified that error appears in the above-identified patent and that said Letters Patent is hereby corrected as shown below:

In Col. 11, line 36, claim 1, before "pulse" insert --to select a clocking--.

Signed and Sealed this
Twenty-third Day of October, 2012

David J. Kappos
*Director of the United States Patent and Trademark Office*